United States Patent
Holz

(10) Patent No.: US 12,147,609 B2
(45) Date of Patent: *Nov. 19, 2024

(54) IDENTIFYING AN OBJECT IN A FIELD OF VIEW

(71) Applicant: ULTRAHAPTICS IP TWO LIMITED, Bristol (GB)

(72) Inventor: David Holz, San Francisco, CA (US)

(73) Assignee: ULTRAHAPTICS IP TWO LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,142

(22) Filed: Nov. 6, 2023

(65) Prior Publication Data
US 2024/0069646 A1 Feb. 29, 2024

Related U.S. Application Data

(63) Continuation of application No. 17/734,973, filed on May 2, 2022, now Pat. No. 11,809,634, which is a
(Continued)

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06F 3/0421* (2013.01);
(Continued)

(58) Field of Classification Search
CPC ............. G06T 7/10; G06T 2207/10012; G06T 2200/04; G06T 7/251; G06T 7/55; G06T 7/344; G06T 2207/10041; G06T 2207/10016; G06F 16/50; G06F 3/0304; G06F 3/0325; G06V 20/64; G06V 20/647; G06V 10/20; G06V 10/40; G06V 10/10;
(Continued)

(56) References Cited

U.S. PATENT DOCUMENTS 6,503,195 B1 1/2003 Keller et al.
7,042,172 B2 5/2006 Dowling et al.
(Continued)

FOREIGN PATENT DOCUMENTS

WO 2014145175 A1 9/2014

*Primary Examiner* — Dismery Mercedes
(74) *Attorney, Agent, or Firm* — HAYNES BEFFEL & WOLFELD LLP; Andrew L. Dunlap; Paul A. Durdik

(57) ABSTRACT

The technology disclosed relates to identifying an object in a field of view of a camera. In particular, it relates to identifying a display in the field of view of the camera. This is achieved by monitoring a space including acquiring a series of image frames of the space using the camera and detecting one or more light sources in the series of image frames. Further, one or more frequencies of periodic intensity or brightness variations, also referred to as 'refresh rate', of light emitted from the light sources is measured. Based on the one or more frequencies of periodic intensity variations of light emitted from the light sources, at least one display that includes the light sources is identified.

21 Claims, 5 Drawing Sheets

Related U.S. Application Data continuation of application No. 17/061,434, filed on Oct. 1, 2020, now Pat. No. 11,321,577, which is a continuation of application No. 16/295,663, filed on Mar. 7, 2019, now Pat. No. 10,832,080, which is a continuation of application No. 15/457,943, filed on Mar. 13, 2017, now Pat. No. 10,229,339, which is a continuation of application No. 14/214,584, filed on Mar. 14, 2014, now Pat. No. 9,625,995.

(60) Provisional application No. 61/791,151, filed on Mar. 15, 2013.

(51) Int. Cl.
*G06F 3/042* (2006.01)
*G06T 7/55* (2017.01)
*G06V 10/20* (2022.01)
*G06V 10/40* (2022.01)
*G06V 20/64* (2022.01)
*G09G 3/34* (2006.01)
*H04N 23/71* (2023.01)
*H04N 23/73* (2023.01)
*H04N 23/74* (2023.01)
*G06V 20/20* (2022.01)

(52) U.S. Cl.
CPC .............. *G06F 3/0425* (2013.01); *G06T 7/55* (2017.01); *G06V 10/20* (2022.01); *G06V 10/40* (2022.01); *G06V 20/64* (2022.01); *G09G 3/3406* (2013.01); *G09G 3/3413* (2013.01); *H04N 23/71* (2023.01); *H04N 23/73* (2023.01); *H04N 23/74* (2023.01); *G06T 2207/10016* (2013.01); *G06T 2207/10028* (2013.01); *G06T 2207/10141* (2013.01); *G06T 2207/20101* (2013.01); *G06V 20/20* (2022.01); *G09G 2320/0626* (2013.01); *G09G 2340/0435* (2013.01); *G09G 2370/042* (2013.01)

(58) Field of Classification Search
CPC ...... G06V 10/141; H04N 23/61; H04N 23/60; H04N 23/675; H04N 23/695; H04N 23/70; H04N 23/74; H04N 23/741; H04N 25/707; G09G 2320/103; G09G 2320/0686

See application file for complete search history.

(56) References Cited

U.S. PATENT DOCUMENTS

| | | |
|---|---|---|
| 7,646,372 B2 | 1/2010 | Marks et al. |
| 7,742,035 B2 | 6/2010 | Wu et al. |
| 8,294,784 B2 | 10/2012 | Schatvet |
| 8,373,690 B2 | 2/2013 | Kurozuka |
| 8,519,952 B2 | 8/2013 | Yee |
| 8,638,989 B2 | 1/2014 | Holz |
| 8,744,170 B2 | 6/2014 | Kato et al. |
| 8,797,340 B2 | 8/2014 | Slavenburg et al. |
| 9,057,931 B1 | 6/2015 | Baldwin |
| 9,607,406 B2 | 3/2017 | Hata et al. |
| 9,625,995 B2 | 4/2017 | Holz |
| 10,229,339 B2 | 3/2019 | Holz |
| 10,832,080 B2 | 11/2020 | Holz |
| 11,321,577 B2 | 5/2022 | Holz |
| 2002/0021275 A1 | 2/2002 | Kataoka et al. |
| 2002/0028001 A1 | 3/2002 | Doi et al. |
| 2003/0006364 A1 | 1/2003 | Katzir et al. |
| 2004/0070565 A1* | 4/2004 | Nayar ............... G06V 10/60 345/156 |
| 2006/0125968 A1 | 6/2006 | Yokozawa et al. |
| 2006/0132859 A1 | 6/2006 | Kalapathy et al. |
| 2007/0146300 A1 | 6/2007 | Wu et al. |
| 2009/0009469 A1* | 1/2009 | Hsu ............... G06F 3/0325 345/158 |
| 2009/0073117 A1 | 3/2009 | Tsurumi et al. |
| 2009/0278794 A1 | 11/2009 | McReynolds et al. |
| 2009/0316952 A1 | 12/2009 | Ferren et al. |
| 2010/0027845 A1 | 2/2010 | Kim et al. |
| 2010/0201808 A1* | 8/2010 | Hsu ............... G06T 7/73 348/135 |
| 2010/0201812 A1 | 8/2010 | McGibney et al. |
| 2010/0231748 A1* | 9/2010 | Takeda ............... H04N 23/6845 348/E5.037 |
| 2011/0080490 A1 | 4/2011 | Clarkson et al. |
| 2011/0122272 A1 | 5/2011 | Fergason |
| 2011/0195782 A1 | 8/2011 | Mao et al. |
| 2011/0211073 A1* | 9/2011 | Foster ............... H04N 23/675 348/222.1 |
| 2012/0026085 A1 | 2/2012 | McEldowney |
| 2012/0033876 A1* | 2/2012 | Momeyer ............... G06V 20/46 382/165 |
| 2012/0121128 A1 | 5/2012 | Lawrence et al. |
| 2012/0140048 A1 | 6/2012 | Levine |
| 2012/0154579 A1 | 6/2012 | Hampapur et al. |
| 2012/0212663 A1 | 8/2012 | Takita |
| 2012/0242795 A1 | 9/2012 | Kane et al. |
| 2012/0262365 A1 | 10/2012 | Mallinson |
| 2012/0262421 A1 | 10/2012 | Kao et al. |
| 2012/0313848 A1 | 12/2012 | Galor et al. |
| 2013/0033618 A1 | 2/2013 | Kato et al. |
| 2013/0147711 A1 | 6/2013 | Njolstad et al. |
| 2013/0176539 A1 | 7/2013 | Kilcher et al. |
| 2013/0182079 A1 | 7/2013 | Holz |
| 2013/0182897 A1 | 7/2013 | Holz |
| 2013/0229396 A1 | 9/2013 | Huebner |
| 2013/0229518 A1 | 9/2013 | Reed et al. |
| 2014/0146999 A1 | 5/2014 | Zeng |
| 2014/0267370 A1 | 9/2014 | Albrecht et al. |
| 2015/0169082 A1 | 6/2015 | Li et al. |

* cited by examiner

IDENTIFYING AN OBJECT IN A FIELD OF VIEW

RELATED APPLICATION

This application is a continuation of U.S. application Ser. No. 17/734,973, entitled "IDENTIFYING AN OBJECT IN A FIELD OF VIEW", filed May 2, 2022, which is a continuation of U.S. application Ser. No. 17/061,434, entitled "IDENTIFYING AN OBJECT IN A FIELD OF VIEW", filed Oct. 1, 2020, which is a continuation of U.S. application Ser. No. 16/295,663, entitled "IDENTIFYING AN OBJECT IN A FIELD OF VIEW", filed Mar. 7, 2019, which is a continuation of U.S. application Ser. No. 15/457,943 entitled "IDENTIFYING AN OBJECT IN A FIELD OF VIEW", filed Mar. 13, 2017, which is a continuation of U.S. application Ser. No. 14/214,584, entitled "IDENTIFYING AN OBJECT IN A FIELD OF VIEW", filed Mar. 14, 2014, which claims the benefit of U.S. provisional Patent Application No. 61/791,151, entitled, "DETERMINING THE POSITION OF A COMPUTER SCREEN," filed Mar. 15, 2013. All related applications are hereby incorporated by reference for all purposes.

FIELD OF THE TECHNOLOGY DISCLOSED

The technology disclosed relates generally to systems and methods for determining the positions objects in three-dimensional space, and more specifically to determining the position of a computer screen or display.

BACKGROUND

Existing systems allow a user to interact with a computer by interpreting the position or movement of the user's body (or any other object) as a user-input command. The system responds to the commands of the user in accordance with software executing on the computer (e.g., an application or game) and displays the results of the received command on a computer screen (referred to herein also as a computer display). For example, the screen can display a representation of a button; the user "presses" the button by, for example, making a forward-moving gesture with a finger. In some instances, however, the system can misinterpret a gesture and perform an action unintended by the user. For example, the system can interpret a gesture as a button press even though the user did not intend such an action. A need therefore exists for a systems and methods that improve the accuracy of interpreting user gestures.

SUMMARY

The technology disclosed relates to identifying an object in a field of view of a camera. In particular, it relates to identifying a display in the field of view of the camera. This is achieved by monitoring a space including acquiring a series of image frames of the space using the camera and detecting one or more light sources in the series of image frames. Further, one or more frequencies of periodic intensity or brightness variations, also referred to as 'refresh rate', of light emitted from the light sources is measured. Based on the one or more frequencies of periodic intensity variations of light emitted from the light sources, at least one display that includes the light sources is identified.

In various implementations, the technology disclosed also provides systems and methods for determining the position of a computer screen with respect to a user or other objects in proximity to the screen. Light emitted by a light source can be captured by a camera; based on the frequency of the light, it can be determined by a screen (by detecting, e.g., the screen's refresh rate). The shape of the screen (or the device in which it is mounted/housed) can further be used to identify the screen. In one implementation, a user input can be used to identify the screen. Once the screen is identified, knowledge of its position (and that of a user) can be used to improve the accuracy with which user gestures are interpreted.

In one aspect, a method of identifying a computer display in a field of view of a camera includes acquiring a series of image frames from the camera, detecting the presence of a light source in the series of images, analyzing the light source across the series of image frames for variations in brightness, and identifying a frequency of the variations as a refresh rate of the computer display.

The rate of capture of the series of image frames can be varied; the rate can be 50, 60, 75, 100, or 120 frames per second. A distance between a user in the field of view of the camera and the computer display can be detected, and a user-input command can be assigned to a gesture of the user based at least in part on the distance. The presence of a rectangular object in one of the image frames can be detected and the rectangular object can be identified as the computer display. Identifying rectangular object as the computer display can include comparing a length, width, or aspect ratio of the rectangular object to a known length, width, or aspect ratio of the computer display. A user can be prompted to touch the computer display and a contact of the user's hand with the computer display can be detected. The user can be prompted to touch the computer display a plurality of times and a plane occupied by the computer display can be derived based on the detected contact. A user can be prompted to point, with a stylus, to a target displayed on the computer display and a position of the stylus can be detected. The user can be prompted to point multiple times at multiple targets and a plane occupied by the computer display can be derived based on the detected position of the stylus. The presence of a second light source can be detected and the light source can be identified as an incandescent bulb, halogen bulb, or fluorescent bulb.

In another aspect, a system of identifying a computer display in a field of view of a camera includes a camera for capturing a series of images of a field of view comprising the computer display and a location module for detecting the presence of a light source in the series of images, analyzing the light source across the series of image frames for variations in brightness, and identifying a frequency of the variations as a refresh rate of the computer display. An image-analysis module can detect a distance between a user in the field of view of the camera and the computer display. The image-analysis module can assign a user-input command to a gesture of the user based at least in part on the distance.

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, steps, or characteristics can be combined in any suitable manner in one or more examples of the technology. The headings provided herein are for convenience only and are not intended to limit or interpret the scope or meaning of the claimed technology.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the implementations herein described, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

As used herein, a given signal, event or value is "responsive to" a predecessor signal, event or value of the predecessor signal, event or value influenced by the given signal, event or value. If there is an intervening processing element, action or time period, the given signal, event or value can still be "responsive to" the predecessor signal, event or value. If the intervening processing element or action combines more than one signal, event or value, the signal output of the processing element or action is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Figure 1:
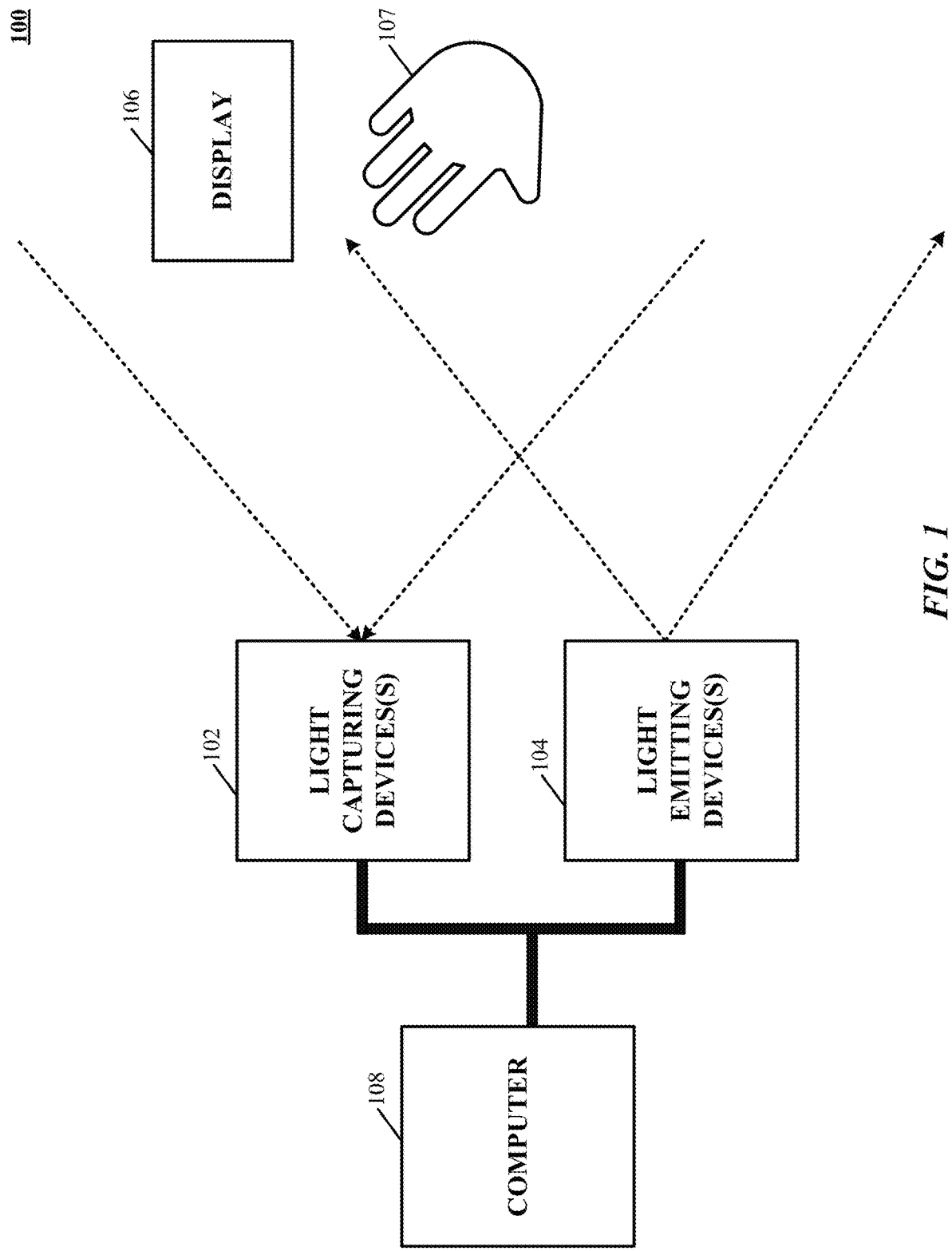
FIG. 1 illustrates an exemplary motion-capture system in accordance with implementations of the technology disclosed.

Motion-capture systems generally include (i) a camera for acquiring images of an object; (ii) a computer for processing the images to identify and characterize the object; and (iii) a computer display for displaying information related to the identified/characterized object. A light source can also be included to illuminate the object. FIG. 1 illustrates an exemplary motion-capture system 100. The system 100 includes one or more light-capturing devices 102 (e.g., digital cameras or similar devices), each including an image sensor (e.g., a CCD or CMOS sensor) and an associated imaging optic (e.g., a lens). Any number of cameras 102 can be arranged such that their fields of view overlap in a viewed region. One or more light-emitting devices 104 can be used to illuminate objects 106, 107 in the field of view. The cameras 102 provide digital image data to a computer 108, which analyzes the image data to determine the 3D position, orientation, and/or motion of the objects 106, 107 the field of view of the cameras 102. One of the objects can be a computer display 106 in wireless or wired communication with the computer 108; as explained in greater detail below, the computer can generate images for the display 106 based at least in part on the position or motion of it or other objects in the field of view of the cameras 102 (e.g., the hand 107 of a user).

The cameras 102 can be, e.g., visible-light cameras, infrared (IR) cameras, ultraviolet cameras, or cameras operating in any other electromagnetic frequency regime. Preferably, the cameras 102 are capable of capturing video images (i.e., successive image frames at a constant rate of, say, fifteen frames per second, although no particular frame rate is required). The particular capabilities of cameras 102 can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be a cube of one meter in length. To capture motion of a running person, the volume of interest might have dimensions of tens of meters in order to observe several strides.

The cameras can be oriented in any convenient manner. In one implementation, the optical axes of the cameras 102 are parallel, but this orientation is not required. As described below, each camera 102 can be used to define a "vantage point" from which the object 106 is seen; if the location and view direction associated with each vantage point are known, the locus of points in space that project onto a particular position in the camera's image plane can be determined. In some implementations, motion capture is reliable only for objects in an area where the fields of view of cameras 102 overlap; the cameras 102 can be arranged to provide overlapping fields of view throughout the area where motion of interest is expected to occur. In other implementations, the system 100 can include one or more light sources 104, and the cameras 102 measure the reflection of the light emitted by the light sources on objects 106. The system can include, for example, two cameras 102 and one light source 104; one camera 102 and two light sources 104; or any other appropriate combination of light sources 104 and cameras 102.

Figure 2:
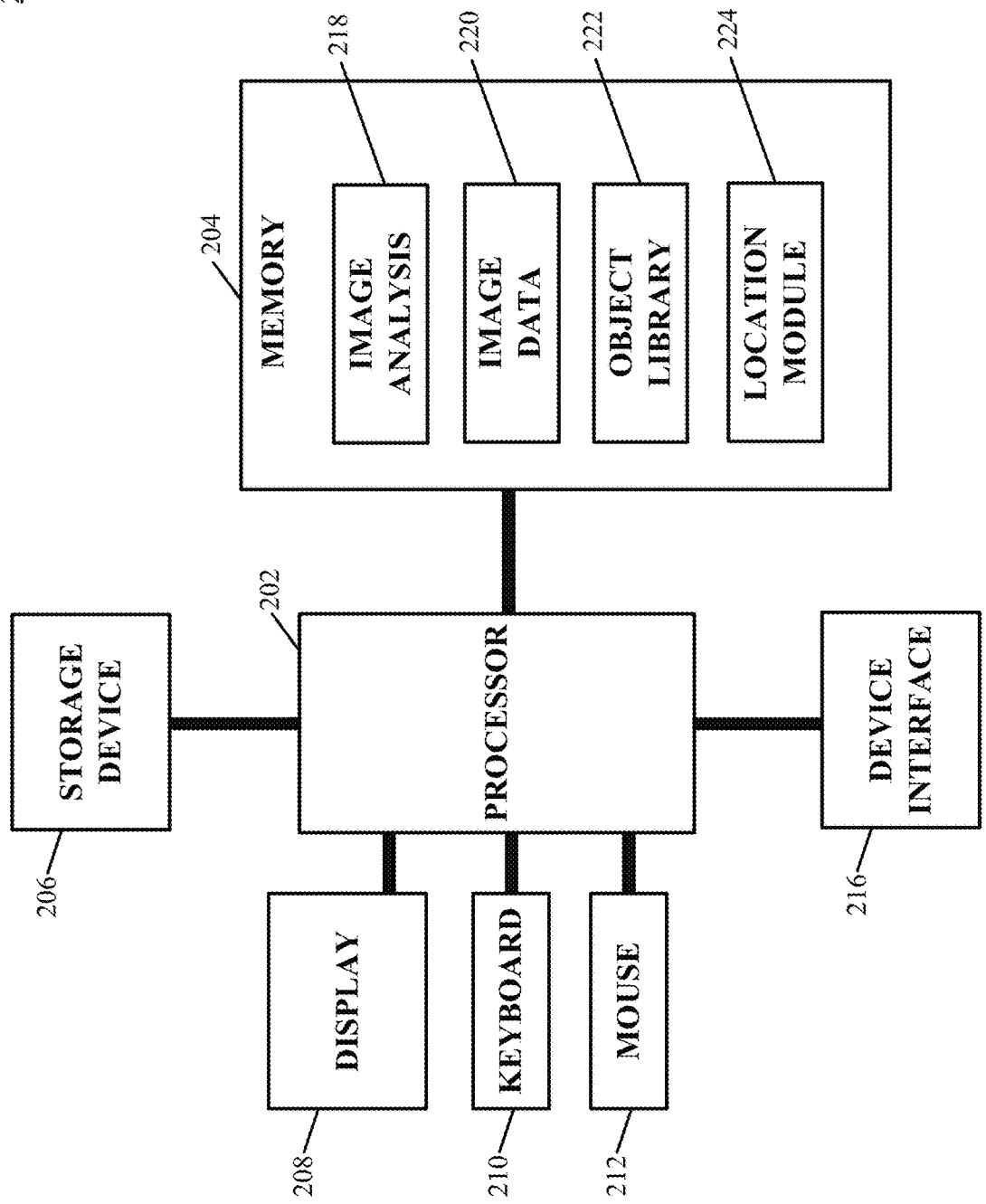
FIG. 2 illustrates an exemplary computer system for image processing, analysis, and display in accordance with implementations of the technology disclosed.

The computer 108 can generally be any device or combination of devices capable of processing image data using techniques described herein. FIG. 2 is a simplified block diagram of a suitably programmed general-purpose computer 200 implementing the computer 108 according to an exemplary implementation of the technology disclosed. The computer 200 includes a processor 202 with one or more central processing units (CPUs), volatile and/or non-volatile main memory 204 (e.g., RAM, ROM, or flash memory), one or more mass storage devices 206 (e.g., hard disks, or removable media such as CDs, DVDs, USB flash drives, etc. and associated media drivers), a display device 208 (e.g., a liquid crystal display (LCD) monitor), user input devices such as keyboard 210 and mouse 212, and one or more buses 214 (e.g., a single system bus shared between all components, or separate memory and peripheral buses) that facilitate communication between these components.

The cameras 102 and/or light sources 104 can connect to the computer 200 via a universal serial bus (USB), FireWire, or other cable, or wirelessly via Bluetooth, Wi-Fi, etc. The computer 200 can include a device interface 216, implemented in hardware (e.g., as part of a USB port) and/or software (e.g., executed by processor 202), that enables communication with the cameras 102 and/or light sources 104. The camera interface 216 can include one or more data ports and associated image buffers for receiving the image frames from the cameras 102; hardware and/or software signal processors to modify the image data (e.g., to reduce noise or reformat data) prior to providing it as input to a motion-capture or other image-processing program; and/or control signal ports for transmit signals to the cameras 102, e.g., to activate or deactivate the cameras, to control camera settings (frame rate, image quality, sensitivity, etc.), or the like.

The main memory 204 can be used to store instructions to be executed by the processor 202, conceptually illustrated as a group of modules. These modules generally include an operating system (e.g., Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION or OPENACTION operating system, iOS, Android or other mobile operating systems, or another operating system platform) that directs the execution of low-level, basic system functions (such as memory allocation, file management, and the operation of mass storage devices), as well as higher-level software applications such as, e.g., a motion-capture (mocap) program 218 for analyzing the camera images to track the position of an object of interest and/or a motion-response program for computing a series of output images (or another kind of response) based on the tracked motion. Suitable algorithms for motion-capture program are described further below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules can be programmed in any suitable programming language, including, without limitation high-level languages such as C, C++, C#, OpenGL, Ada, Basic, Cobra, FORTRAN, Java, Lisp, Perl, Python, Ruby, or Object Pascal, or low-level assembly languages.

The memory 204 can further store input and/or output data associated with execution of the instructions (including, e.g., input and output image data 220) as well as additional information used by the various software applications; for example, in some implementations, the memory 204 stores an object library 222 of canonical models of various objects of interest. As described below, an object detected in the camera images can identified by matching its shape to a model in the object library 222, and the model can then inform further image analysis, motion prediction, etc.

In various implementations, the motion captured in a series of camera images is used to compute a corresponding series of output images for display on the (computer) display screen 208. For example, camera images of a moving hand can be translated into a wire-frame or other graphic depiction of the hand by the processor 202. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, which can, but need not be, implemented in main memory 204. A video display controller reads out the frame buffer to generate a data stream and associated control signals to output the images to the display 208. The video display controller can be provided along with the processor 202 and memory 204 on-board the motherboard of the computer 200, and can be integrated with the processor 202 or implemented as a co-processor that manipulates a separate video memory. In some implementations, the computer 200 is equipped with a separate graphics or video card that aids with generating the feed of output images for the display 208. The video card generally includes a graphical processing unit ("GPU") and video memory, and is useful, in particular, for complex and computationally expensive image processing and rendering. The graphics card can implement the frame buffer and the functionality of the video display controller (and the on-board video display controller can be disabled). In general, the image-processing and motion-capture functionality of the system can be distributed between the GPU and the main processor 202 in various conventional ways that are well characterized in the art.

The computer 200 is an illustrative example; variations and modifications are possible. Computers can be implemented in a variety of form factors, including server systems, desktop systems, laptop systems, tablets, smart phones or personal digital assistants, and so on. A particular implementation can include other functionality not described herein, e.g., wired and/or wireless network interfaces, media playing and/or recording capability, etc. In some implementations, one or more cameras can be built into the computer rather than being supplied as separate components. Further, the computer processor can be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices.

Further, while the computer 200 is described herein with reference to particular blocks, this is not intended to limit the technology disclosed to a particular physical arrangement of distinct component parts. For example, in some implementations, the cameras 102 are connected to or integrated with a special-purpose processing unit that, in turn, communicates with a general-purpose computer, e.g., via direct memory access ("DMA"). The processing unit can include one or more image buffers for storing the image data read out from the camera sensors, a GPU or other processor and associated memory implementing at least part of the motion-capture algorithm, and a DMA controller. The processing unit can provide processed images or other data derived from the camera images to the computer for further processing. In some implementations, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

Figure 4:
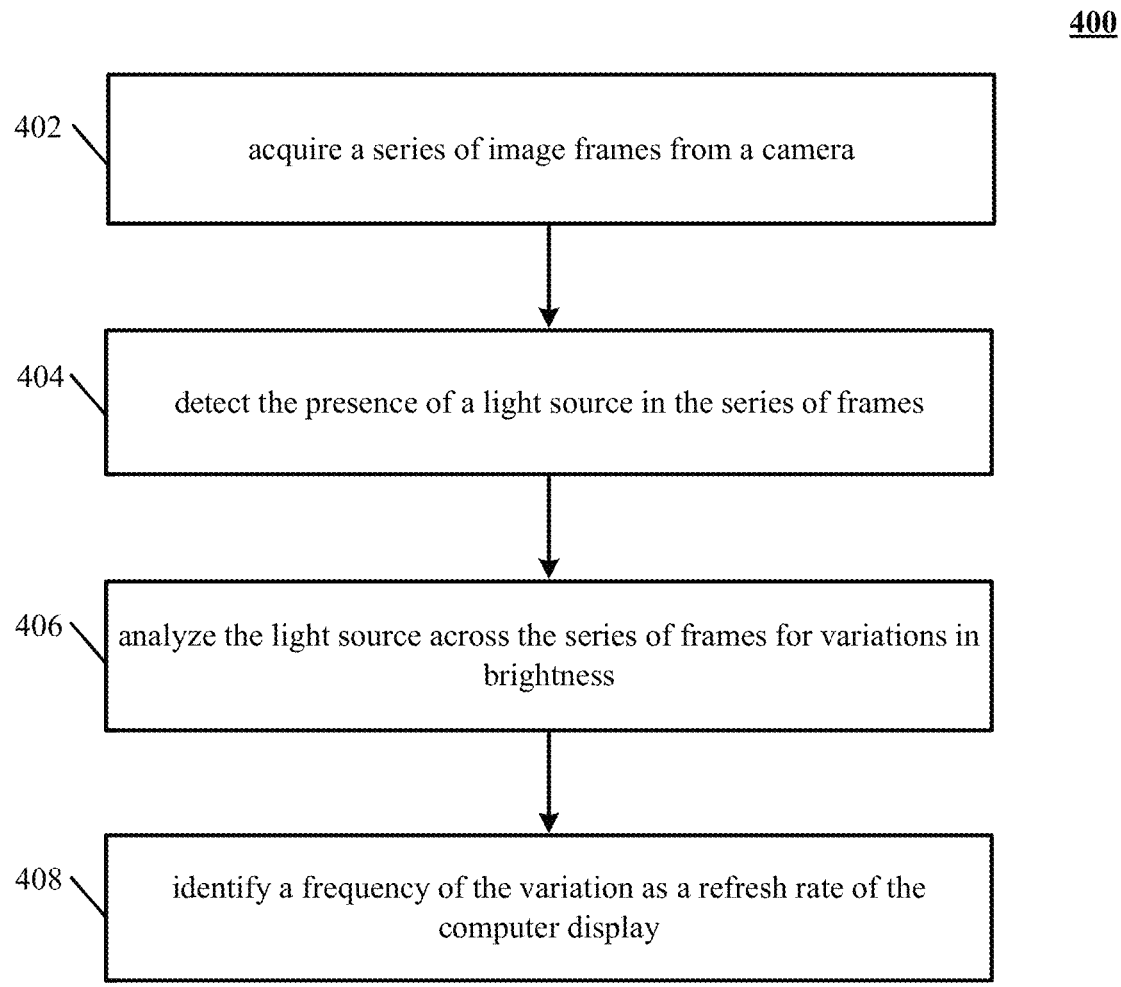
FIG. 4 illustrates a flowchart for identifying a computer display in accordance with implementations of the technology disclosed.

In one implementation, a location module 224 identifies an object as the display 208. the display 208 can be positioned within the field of view of the cameras 102; in accordance with the flowchart 400 illustrated in FIG. 4, images from the camera 102 are received by the device interface 216 (action 402) can thus include representations of the display 208. The display 208 can display images on its screen by periodically refreshing the screen (i.e., displaying a first frame on the screen, waiting a certain amount of time, displaying a second frame, and so on). This periodic refreshing is known as the refresh rate of the display 208. In some implementations, the refresh rate is the same as the frame rate of the display; in other implementations, the two rates differ (i.e., one frame is refreshed more than once). As the term is used herein, the refresh rate is the rate at which a display's intensity of emitted light rises and falls, whatever mechanism or system causes it to do so. Displays created using any number of technologies (e.g., cathode-ray tubes, plasma, LCD, or LED displays) can utilize this method of updating. Because of the refresh rate, the intensity or luminosity of the light emitted by the display 208 and captured by the camera 102 can vary; if, for example, an image is captured during or soon after a refresh, the intensity of the light captured is high. If, on the other hand, an image is captured just before a next refresh of the display, the intensity can be low. The presence of a light source can be detected in the series of images (action 404) by, for example, comparing the intensities of areas of each image and/or by detecting display-like shapes in the series of images.

Figure 3:
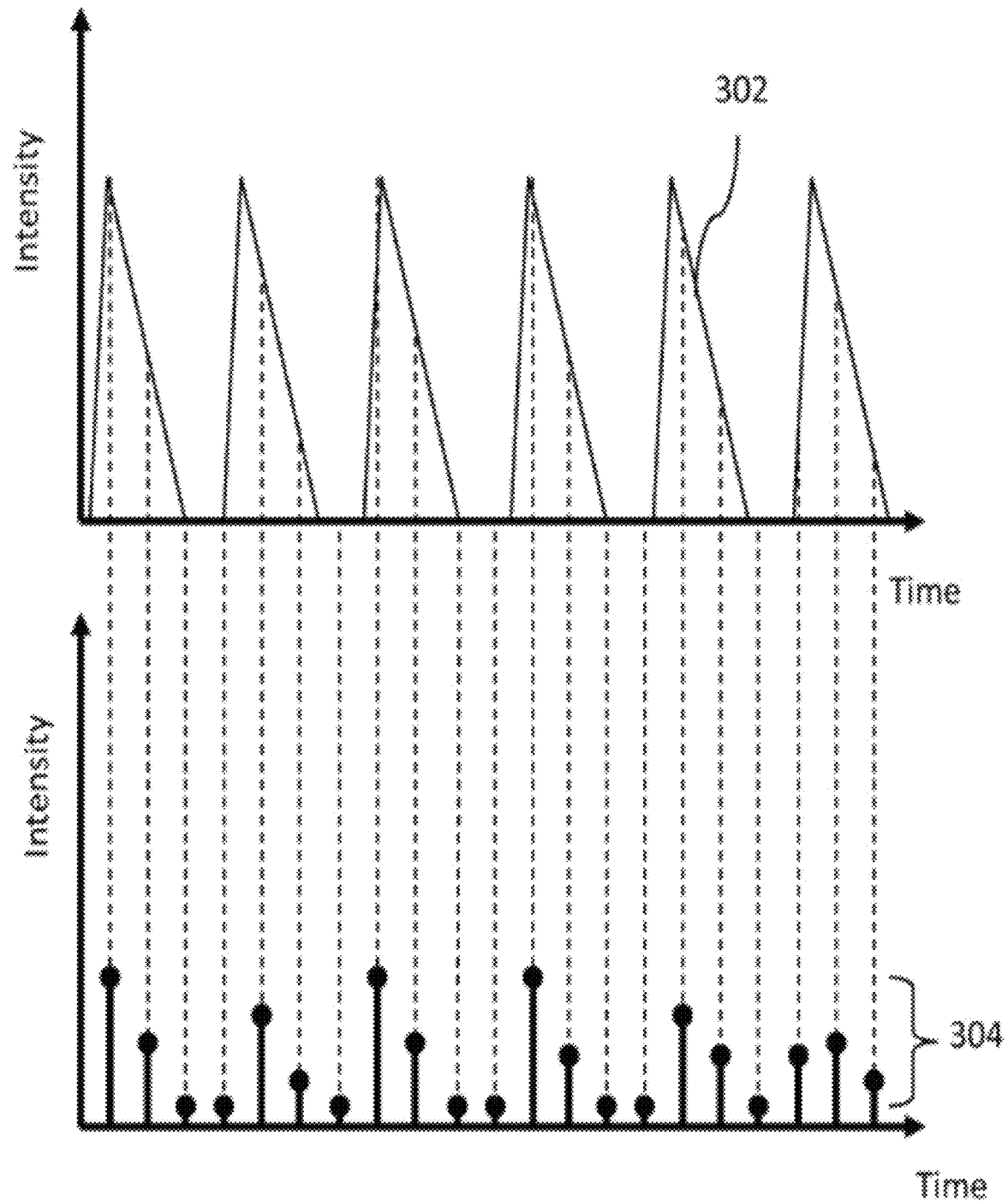
FIG. 3 illustrates an exemplary display intensity and captured samples thereof in accordance with implementations of the technology disclosed.

FIG. 3 illustrates an exemplary chart 300 showing the intensity 302 of light emitted by the display 208. As the display 208 refreshes (as, e.g., its LED drivers fire) the intensity 302 increases; as time passes, however, the intensity decreases until a next refresh. The intensity 302 is depicted as a saw-tooth wave in FIG. 3, but the intensity 302 can have any shape (e.g., a sine wave, square wave, pulse with exponential decay, etc.).

The intensity 302 of the display 208 is captured by the camera 102 as a series of samples 304, in accordance with a frame rate of the camera 102, taken from a series of images captured therefrom. The series of images can be a series of temporally sequential images that include the display 208 and are taken at a certain number of frames per second, such as 50, 60, 75, 100, or 120 frames per second. If a sample 304 is taken at a high point on the intensity curve 302, it can receive a high value, and if the sample is taken at a low point on the curve 302, it can receive a low value. Any method of determining the samples 304 is within the scope of the technology disclosed such as, for example, analyzing the pixels in an acquired series of images corresponding to the display 208 and determining their intensity values.

Analysis of the samples 304 (using, for example, the image-analysis module 218, the location module 224, or similar variants thereof) yields a frequency of the intensity curve 302 (action 406). In one implementation, the peaks (or any other distinguishing feature) of the intensity curve 302, from which the frequency of the curve 302 can be computed. In another implementation, the beat frequency between the frequency of the intensity curve 302 and the frequency of the sample rate of the samples 304 is determined by analyzing the samples 304; given the beat frequency and the frequency of the sample rate (i.e., the frames-per-second of the camera 102), the frequency of the intensity curve can be computed.

The frequency of the intensity curve 302 can be used to identify the object producing the sample curve 302 as a computer display (action 408). For example, if the frequency is 60 Hz or 72 Hz, the object is deemed to be a computer display because those are common display refresh rates. The system 200 can maintain a list of recognized refresh rates in the memory 204 and compare the frequencies thereto. In one implementation, the system can tolerate a deviation of 1%, 2%, or 5% in the computed frequency to a recognized refresh rate and still deem a match. The list of refresh rates can be updated by a user or by a software update or patch.

In one implementation, the image-analysis module 218 determines a shape for an object detected in a field of view of the camera 102. A length and width of the object can be determined in accordance with the methods and systems described above; if the length and width fall within a range of accepted lengths and widths for computer displays, the system 200 can deem the object to be a computer display. The system 200 can analyze other attributes of the object (such as its aspect ratio and/or placement in the field of view) in making this determination. The physical attributes of the object can be used to differentiate the object from another type of periodically fluctuating light source, such as an incandescent, fluorescent, or halogen bulb.

The location module 224 can prompt the user to assist in determining and locating the display 208. In one implementation, the location module displays a graphical or textual prompt on the display 208 instructing the user to touch the display; the image-analysis module 218 can track the motion of the user (e.g., the hand of the user) using the systems and methods described above and detect when the user's hand has made contact with the display 208. At that time, the system 200 deems the object being touched to be the display 208. In another implementation, the location module 224 displays a target on the display 208 and prompts the user to point a stylus or similar object at the target; by detecting the angle and position of the stylus, the location module 224 deems the object being pointed at to be the display 208. In related implementations, the user can touch or point to multiple (e.g., three) locations on the display 208, from which the location module 224 can deduce the plane in which the display 208 lies.

Once the display 208 is identified, its position can be determined relative to the system 200 and/or to a user. The distance between the display 208 and the user can be used to accept, decline, or modify gestures of the user as user-input commands. For example, if the user gestures toward the display 208 in a button-pressing motion, the motion can be interpreted as a first user-input command at one distance and a second user-input command at a second distance. The interpretation of the user gesture can further depend on the amount of distance over which the gesture travels; a small motion can register as a user-input command at a small user-to-screen distance while the same small motion may not register as a user-input command at a large distance. For example, in order to make a button-pressing gesture, a user can need to make his or her finger travel over a greater distance when the user is farther from the display 208; at a smaller user-to-display distance, a lesser distance of travel triggers button-pressing user-input command.

Figure 5:
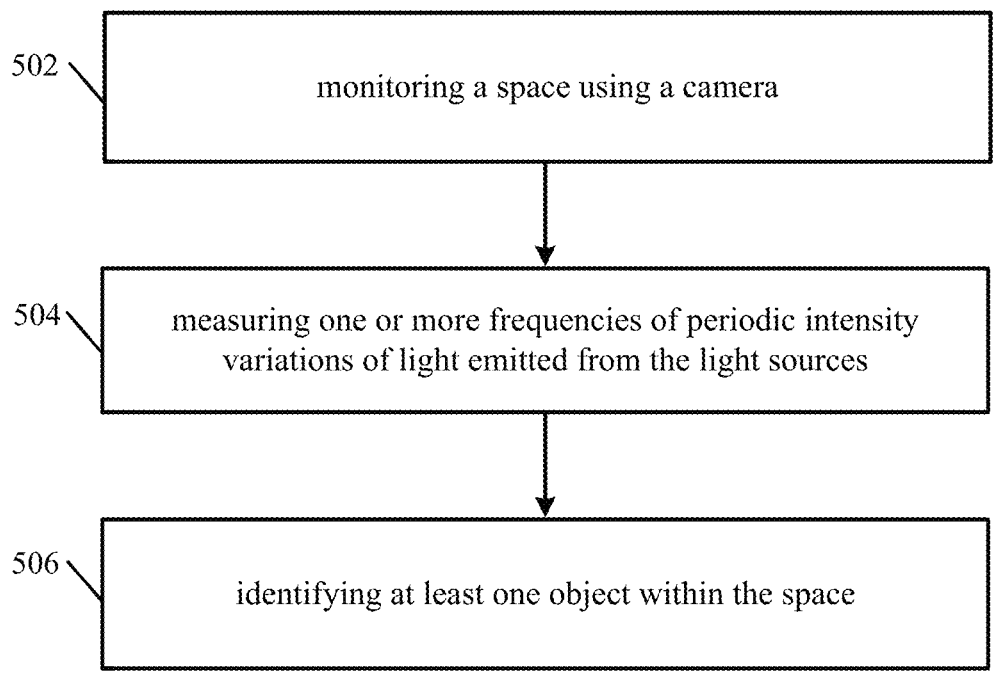
FIG. 5 is a flowchart showing of a method of identifying an object in a field of view of camera.

FIG. 5 is a flowchart showing of a method of identifying an object in a field of view of camera. Flowchart 500 can be implemented at least partially with and/or by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to the system that carries out a method. The system is not necessarily part of the method.

At action 502, a space is monitored using a camera. This is accomplished by capturing a series of image samples of the space in accordance with a frame rate of the camera, according to one implementation. The series of images can be a series of temporally sequential images that include a light source such as a display and are taken at a certain number of frames per second, such as 50, 60, 75, 100, or 120 frames per second, as discussed above.

At action 504, one or more frequencies of periodic intensity or brightness variations of light emitted from the light sources (refresh rate) is measured in response to detection of one or more light sources in the space. In one implementation, a beat frequency of the periodic brightness variations is used against the capture rate to determine the refresh rate, as discussed above.

At action 506, at least one object is identified within the space that includes the light sources based on the measured frequencies of periodic intensity variations. In some implementations, a shape of the identified object is determined along with a length, width, or aspect ratio of the identified object, as discussed above. In one implementation, the object is identified as a display when the shape of the identified object is rectangular. Some implementations of identifying the object as a display further include comparing a length, width, or aspect ratio of the identified object to a predetermined length, width, or aspect ratio of the display. In other implementations, the object is identified as an incandescent bulb, halogen bulb, or fluorescent bulb based on the determined shape.

In some implementations, a distance between a user in the field of view of the camera and the object is determined, as discussed above. Further, a context is set for interpreting user gestures as user-input commands based at least in part on the determined distance. In other implementations, a user is prompted to make a plurality of contacts at multiple locations on the display, based on which a plane occupied by the display is determined. In yet other implementations, the user is prompted to point, with a stylus, to a target presented on the display, based on which a position of the stylus is calculated. Further, the user is prompted to point multiple times at multiple targets, responsive to which a plane occupied by the display is determined based on the detected positions of the stylus.

It should also be noted that implementations of the technology disclosed can be provided as one or more computer-readable programs embodied on or in one or more articles of manufacture. The article of manufacture can be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs can be implemented in any programming language. Some examples of languages that can be used include C, C++, or JAVA. The software programs can be further translated into machine language or virtual machine instructions and stored in a program file in that form. The program file can then be stored on or in one or more of the articles of manufacture.

Certain implementations of the technology disclosed were described above. It is, however, expressly noted that the technology disclosed is not limited to those implementations, but rather the intention is that additions and modifications to what was expressly described herein are also included within the scope of the technology disclosed. Moreover, it is to be understood that the features of the various implementations described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed. As such, the technology disclosed is not to be defined only by the preceding illustrative description.

What is claimed is:

1. A camera, including:
   an imaging optic including at least a lens;
   an image sensor to perform capturing a series of image frames including objects within a field of view of the camera; and
   a communications connection providing communications via device interface with a computer; and
   wherein the computer comprises at least one processor and a memory that stores instructions for recognizing a display in a field of view of a camera; and
   wherein the instructions, when executed implement:
   recognition that one or more light sources in the series of image frames is a display captured by the camera in the series of image frames; and
   provision of an indication that the one or more light sources is recognized as a display; and
   wherein recognition is based on a rate of periodic change in brightness of one or more light sources detected in the series of image frames.

2. The camera of claim 1, wherein the image sensor includes a sensor selected from a charge-coupled device (CCD) sensor and a complementary metal oxide semiconductor (CMOS) sensor.

3. The camera of claim 1, wherein the camera is one selected from a visible-light camera, an infrared (IR) camera, an ultraviolet camera, and a camera operating in another electromagnetic frequency regime.

4. The camera of claim 1, wherein rate of periodic change in brightness is determined by measuring frequencies of the one or more light sources over time.

5. The camera of claim 1, further including the camera having a variable rate of capture of the series of image frames.

6. The camera of claim 5, wherein the rate of capture is selected from at least 50, 60, 75, 100, or 120 frames per second.

7. The camera of claim 5, wherein the instructions when executed further implement using a beat frequency of periodic brightness variations against the rate of capture to determine a rate of periodic change in brightness.

8. The camera of claim 1, wherein the instructions when executed further implement determining a distance between a user in the field of view of the camera and the display.

9. The camera of claim 8, wherein the instructions when executed further implement setting a context for interpreting user gestures as user-input commands based at least in part on the determined distance.

10. The camera of claim 1, wherein the instructions when executed further implement prompting a user to make a plurality of contacts at multiple locations on the display and determining a plane occupied by the display based on the plurality of contacts.

11. The camera of claim 1, wherein the instructions when executed further implement prompting a user to point, with a stylus, to a target presented on the display and detecting a position of the stylus.

12. The camera of claim 11, wherein the instructions when executed further implement prompting the user to point multiple times at multiple targets and determining a plane occupied by the display based on the detected position of the stylus.

13. The camera of claim 1, wherein recognition of one or more light sources as a display includes:
   computing a frequency of an intensity curve for an object; and
   using the frequency of the intensity curve as computed to identify the object.

14. The camera of claim 1, wherein recognition of one or more light sources as a display includes determining a shape of the display.

15. The camera of claim 14, wherein the instructions when executed further implement determining a length, a width, or an aspect ratio of the display.

16. The camera of claim 1, wherein recognition of one or more light sources as a display includes determining that a shape of the display is rectangular.

17. The camera of claim 1, wherein recognition of one or more light sources as a display includes comparing a length, a width, or an aspect ratio of the display to a predetermined length, a predetermined width, or a predetermined aspect ratio of the display.

18. An apparatus, including:
   a plurality of cameras arranged such that at least a portion of their fields of view overlap in a viewed region to perform capturing a series of image frames including objects within their fields of view; and
   a communications connection providing communications via device interface with a computer; and
   wherein the computer comprises at least one processor and a memory that stores instructions for recognizing a display in a field of view of a camera; and
   wherein the instructions, when executed implement:
      recognition that one or more light sources in the series of image frames is a display captured by the camera in the series of image frames; and
      provision of an indication that the one or more light sources is recognized as a display; and
      wherein recognition is based on a rate of periodic change in brightness of one or more light sources detected in the series of image frames.

19. The apparatus of claim 18, wherein each camera comprises an image sensor selected from a charge-coupled device (CCD) sensor and a complementary metal-oxide semiconductor (CMOS) sensor.

20. The apparatus of claim 18, wherein each camera is one selected from a visible-light camera, an infrared (IR) camera, an ultraviolet camera, and a camera operating in another electromagnetic frequency regime.

21. A system, including:
   one or more cameras to perform capturing a series of image frames including objects within a field of view of the camera; and
   a computer communicatively coupled to the one or more cameras, and including at least one processor and a memory that stores instructions for recognizing a display in a field of view of a camera; wherein the instructions, when executed implement:
   recognition that one or more light sources identified in the series of image frames is a display captured by the camera in the series of image frames, wherein recognition is based on a rate of periodic change in brightness of one or more light sources detected in the series of image frames; and
   provision of an indication that the one or more light sources is recognized as a display.

* * * * *